US 7,262,848 B2

(12) United States Patent
Peupelmann et al.

(10) Patent No.: US 7,262,848 B2
(45) Date of Patent: *Aug. 28, 2007

(54) FIBER POLARIMETER, THE USE THEREOF, AS WELL AS POLARIMETRIC METHOD

(75) Inventors: Jens Peupelmann, Krummenhennersdorf (DE); Egbert Krause, Burgstaedt (DE); Adalbert Bandemer, Dachau (DE)

(73) Assignee: Thorlabs GmbH, Karlsfeld (DE)

( * ) Notice: Subject to any disclaimer, the term of this patent is extended or adjusted under 35 U.S.C. 154(b) by 228 days.

This patent is subject to a terminal disclaimer.

(21) Appl. No.: 10/969,968

(22) Filed: Oct. 22, 2004

(65) Prior Publication Data
US 2005/0083525 A1 Apr. 21, 2005

Related U.S. Application Data

(63) Continuation of application No. 10/147,143, filed on May 15, 2002, now Pat. No. 6,816,260.

(30) Foreign Application Priority Data
May 17, 2001 (DE) .................. 101 24 291
Mar. 6, 2002 (DE) .................. 102 09 826

(51) Int. Cl.
*G01J 4/00* (2006.01)
(52) U.S. Cl. .................. 356/364; 356/366; 356/367
(58) Field of Classification Search ............... None
See application file for complete search history.

(56) References Cited

U.S. PATENT DOCUMENTS

| 2,922,331 | A | 1/1960 | Fastie et al. |
| 3,917,407 | A | 11/1975 | Newstead |
| 3,936,191 | A | 2/1976 | Chupp |
| 4,025,196 | A | 5/1977 | Chupp et al. |
| 4,299,488 | A | 11/1981 | Tomlinson, III |
| 4,832,492 | A | 5/1989 | Calvani et al. |

(Continued)

FOREIGN PATENT DOCUMENTS

DE 24 37 253 A1 5/1975

(Continued)

OTHER PUBLICATIONS

Azzam et al. "General analysis and Optimization of the four-detector photopolarimeter," *J. Opt. Soc. Am.*, vol. 5, No. 5 (May 1988).

(Continued)

*Primary Examiner*—Roy M. Punnoose
(74) *Attorney, Agent, or Firm*—Finnegan, Henderson, Farabow, Garrett & Dunner, L.L.P.

(57) ABSTRACT

A fiber polarimeter has one or more oblique fiber Bragg gratings disposed one behind the other in a fiber. The fiber Bragg gratings couple out portions of a light wave input to the fiber depending on its polarization. For more than one fiber Bragg grating a wave plate is disposed in the fiber between consecutive fiber Bragg gratings. The portions of the light wave from the fiber Bragg grating(s) are detected to produce measurement data that is used to calculate four Stokes parameters for determining polarization, degree of polarization and/or power of the light wave.

35 Claims, 7 Drawing Sheets

U.S. PATENT DOCUMENTS

| | | |
|---|---|---|
| 4,856,899 A | 8/1989 | Iwaoka et al. |
| 4,926,429 A | 5/1990 | Chung |
| 4,953,939 A | 9/1990 | Epworth |
| 5,227,623 A | 7/1993 | Heffner |
| 5,233,405 A | 8/1993 | Wildnauer et al. |
| 5,296,913 A | 3/1994 | Heffner |
| 5,337,146 A | 8/1994 | Azzam |
| 5,379,318 A | 1/1995 | Weber |
| 5,394,488 A | 2/1995 | Fernald et al. |
| 5,396,361 A | 3/1995 | Sasaki et al. |
| 5,420,416 A | 5/1995 | Iida et al. |
| 5,430,454 A | 7/1995 | Refregier et al. |
| 5,430,817 A | 7/1995 | Vengsarkar |
| 5,473,457 A | 12/1995 | Ono |
| 5,532,818 A | 7/1996 | Tokumoto |
| 5,541,756 A | 7/1996 | Chang-Hasnain et al. |
| 5,550,654 A | 8/1996 | Erdogan et al. |
| 5,557,694 A | 9/1996 | Veith et al. |
| 5,617,234 A | 4/1997 | Koga et al. |
| 5,633,959 A | 5/1997 | Niki et al. |
| 5,717,489 A | 2/1998 | Ozeki et al. |
| 5,748,815 A | 5/1998 | Hamel et al. |
| 5,754,322 A | 5/1998 | Ishikawa et al. |
| 5,780,843 A | 7/1998 | Cliche et al. |
| 5,790,289 A | 8/1998 | Taga et al. |
| 5,793,511 A | 8/1998 | Bülow |
| 5,796,479 A | 8/1998 | Derickson et al. |
| 5,812,262 A | 9/1998 | Ridyard et al. |
| 5,815,270 A | 9/1998 | Lee |
| 5,818,987 A | 10/1998 | Bakhti et al. |
| 5,828,059 A * | 10/1998 | Udd ............... 250/227.18 |
| 5,835,199 A | 11/1998 | Phillips et al. |
| 5,841,557 A | 11/1998 | Otsuka et al. |
| 5,859,939 A | 1/1999 | Fee et al. |
| 5,878,071 A | 3/1999 | Delavaux |
| 5,887,094 A | 3/1999 | Bakhti et al. |
| 5,894,362 A | 4/1999 | Onaka et al. |
| 5,896,211 A | 4/1999 | Watanabe |
| 5,903,683 A | 5/1999 | Lowry |
| 5,911,016 A | 6/1999 | Naito |
| 5,920,414 A | 7/1999 | Miyachi et al. |
| 5,930,414 A | 7/1999 | Fishman et al. |
| 5,993,073 A | 11/1999 | Hamakawa et al. |
| 6,044,093 A | 3/2000 | Ventrudo et al. |
| 6,069,697 A | 5/2000 | Tanimoto et al. |
| 6,130,766 A | 10/2000 | Cao |
| 6,144,450 A | 11/2000 | Jopson et al. |
| 6,201,907 B1 | 3/2001 | Farries |
| 6,211,957 B1 | 4/2001 | Erdogan et al. |
| 6,215,565 B1 | 4/2001 | Davis et al. |
| 6,233,373 B1 | 5/2001 | Askins et al. |
| 6,268,943 B1 | 7/2001 | Kang |
| 6,271,922 B1 | 8/2001 | Bulow et al. |
| 6,298,184 B1 | 10/2001 | Putnam et al. |
| 6,307,984 B1 | 10/2001 | Watanabe |
| 6,330,375 B1 | 12/2001 | Fishman et al. |
| 6,342,945 B1 | 1/2002 | Allen et al. |
| 6,380,533 B1 | 4/2002 | Jopson et al. |
| 6,380,553 B2 | 4/2002 | Gudesen et al. |
| 6,381,385 B1 | 4/2002 | Watley et al. |
| 6,384,916 B1 | 5/2002 | Furtak |
| 6,396,051 B1 | 5/2002 | Li et al. |
| 6,400,869 B2 | 6/2002 | Pan et al. |
| 6,483,958 B2 | 11/2002 | Bandemer et al. |
| 6,513,390 B1 * | 2/2003 | De La Puente et al. ...... 73/800 |
| 6,529,648 B1 | 3/2003 | Noe |
| 6,538,787 B1 | 3/2003 | Moeller et al. |
| 6,542,650 B2 | 4/2003 | Khosravani et al. |
| 6,559,991 B1 | 5/2003 | Farley et al. |
| 6,563,590 B2 | 5/2003 | Chowdhury et al. |
| 6,574,394 B1 | 6/2003 | Laming et al. |
| 6,591,038 B1 | 7/2003 | Pezeshki |
| 6,594,408 B1 | 7/2003 | Noe |
| RE38,359 E | 12/2003 | Olshansky |
| 6,671,464 B1 | 12/2003 | Kikuchi |
| 6,674,928 B2 | 1/2004 | Johnson et al. |
| 6,744,509 B2 | 6/2004 | Davis et al. |
| 6,816,260 B2 * | 11/2004 | Peupelmann et al. ....... 356/364 |
| 6,816,261 B2 | 11/2004 | Patel et al. |
| 6,885,783 B2 | 4/2005 | Bandemer et al. |
| 6,912,088 B2 | 6/2005 | Bandemer |
| 6,917,427 B2 | 7/2005 | Krause et al. |
| 6,996,297 B2 | 2/2006 | Krause et al. |
| 6,999,659 B1 | 2/2006 | Nowak et al. |
| 2001/0028760 A1 | 10/2001 | Yaffe |
| 2001/0038729 A1 | 11/2001 | Westbrook |
| 2002/0075477 A1 | 6/2002 | Yu et al. |
| 2002/0080715 A1 | 6/2002 | Weber et al. |
| 2003/0147647 A1 | 8/2003 | Funami et al. |
| 2004/0161242 A1 | 8/2004 | Xu |
| 2005/0083525 A1 | 4/2005 | Peupelmann et al. |
| 2006/0027737 A1 | 2/2006 | Bandemer et al. |

FOREIGN PATENT DOCUMENTS

| | | |
|---|---|---|
| DE | 31 47 555 A1 | 6/1983 |
| DE | 36 43 569 A1 | 6/1987 |
| DE | 36 15 305 A1 | 11/1987 |
| DE | 43 17 863 A1 | 12/1994 |
| DE | 44 11 063 A1 | 10/1995 |
| DE | 695 00 401 T2 | 10/1997 |
| DE | 197 12 768 A1 | 11/1997 |
| DE | 693 12 658 T2 | 12/1997 |
| DE | 198 16 178 A | 10/1999 |
| DE | 198 16 612 A1 | 10/1999 |
| DE | 198 18 699 A1 | 10/1999 |
| DE | 198 25 876 A1 | 12/1999 |
| DE | 198 30 990 A | 1/2000 |
| DE | 198 41 755 A1 | 3/2000 |
| DE | 198 60 895 A1 | 6/2000 |
| DE | 199 11 964 A1 | 9/2000 |
| DE | 199 19 300 A1 | 11/2000 |
| DE | 100 33 819 A1 | 9/2001 |
| DE | 100 35 083 A1 | 9/2001 |
| DE | 100 23 708 A1 | 11/2001 |
| DE | 100 33 820 A1 | 2/2002 |
| DE | 100 49 784 A1 | 5/2002 |
| DE | 100 55 189 A1 | 5/2002 |
| DE | 101 16 855 A1 | 10/2002 |
| DE | 100 10 676 A1 | 9/2004 |
| EP | 0 260 745 A1 | 3/1988 |
| EP | 0 347 994 A2 | 12/1989 |
| EP | 0 347 994 A3 | 12/1989 |
| EP | 0 376 449 A1 | 7/1990 |
| EP | 0 271 934 B1 | 9/1995 |
| EP | 0 703 679 A2 | 3/1996 |
| EP | 0 810 752 A2 | 12/1997 |
| EP | 0 826 990 A | 3/1998 |
| EP | 0 829 740 A | 3/1998 |
| EP | 0 855 811 A2 | 7/1998 |
| EP | 0 859 249 A1 | 8/1998 |
| EP | 0 964 237 A1 | 12/1999 |
| EP | 1 109 338 A2 | 6/2001 |
| EP | 0 707 226 B1 | 9/2001 |
| EP | 1 135 707 B1 | 8/2003 |
| EP | 1 161 699 B1 | 10/2003 |
| JP | 04-116607 A2 | 4/1992 |
| JP | 06-315010 A2 | 11/1994 |
| JP | 08-181666 A2 | 7/1995 |
| JP | 07-218935 A2 | 8/1995 |
| JP | 08-237224 A2 | 9/1996 |
| JP | 08-251105 A2 | 9/1996 |
| JP | 09-064819 A2 | 3/1997 |
| JP | 09-185023 A2 | 7/1997 |

| | | | |
|---|---|---|---|
| JP | 09-252283 A2 | 9/1997 | |
| JP | 09-261205 A2 | 10/1997 | |
| JP | 10-224829 A2 | 8/1998 | |
| JP | 11-052151 A2 | 2/1999 | |
| WO | WO99/49340 A2 | 9/1999 | |
| WO | WO99/67609 A1 | 12/1999 | |
| WO | WO 00/77956 A1 | 12/2000 | |
| WO | WO 01/03336 A1 | 1/2001 | |
| WO | WO 01/09655 A1 | 2/2001 | |
| WO | WO 01/86333 A2 | 11/2001 | |
| WO | WO 02/07351 A1 | 1/2002 | |
| WO | WO 02/32023 A1 | 4/2002 | |

OTHER PUBLICATIONS

Azzam, "Inline Light Saving Photopolarimeter and its Fiber Optic Analog," *Optic Letters*, vol. 12, No. 8, pp. 558-560, (1987).
Bouzid et al., "Fiber-Optic Four-Detector Polarimeter," *Optics Communications*, 118, pp. 329-334 (1995).
Erdogan et al., "Characterization of UV-induced birefringence in photo-sensitive Ge-doped silica optical fibers," *J. Opt. Soc. Am. B*, vol. 11, No. 10, pp. 2100-2105 (1994).
Erdogan et al., "Tilted Fiber Phase Gratings," *J. Opt. Soc. Am. A*, vol. 13, No. 2, pp. 296-313 (Feb. 1996).
Habli, "Experimental Implementation of a fiber optic four detector photopolarimeter," *Optik*, vol. 110, No. 9, pp. 433-435 (1999).
Pikaar et al., "Fast Complete Polarimeter for Optical Fibres," E-FOC (1989).
Ulrich et al., "Bending-induced birefringence in single-mode fibers," *Optics Letters*, vol. 5, No. 6, (1980).
Amrani, A. et al., "Degradation surveillance module for optical transport networks," Conference Proceedings. LEOS' 98, 11th Annual Meeting. IEEE Lasers and Electro-Optics Society, 1998 Annual Meeting, Dec. 1, 1998, pp. 289-290, vol. 1.
Amrani, A. et al., "Optical Monitoring System for Scalable All-optical networks," Conference Proceedings, LEOS '97, 10th Annual Meeting. IEEE Lasers and Electro-optics Society 1997, Nov. 10, 1997, pp. 270-271, vol. 2.
Asahi, K. et al., "Optical Performance Monitor Built into EDFA Repeaters for WDM Networks," OFC '98, Optical Fiber Communication Conference and Exhibit, Technical Digest, Conference Edition, pp. 318-319, (Feb. 22-27, 1998).
Azzam, R.M.A. et al., "Construction, calibration, and testing of a four-detector photopolarimeter," *Rev. Sci. Instrum.* 59(1):84-88 (1988).
Barnes, R.M. and Jarrell, R.F., "Gratings and Grating Instruments," in *Analytical Emission Spectroscopy*, Section 4, E.L. Grove, Ed., M. Dekker, New York, pp. 254-257, 282-287, 304-309 (1971).
Berger, M. et al., "Pan-European Optical Networking Using Wavelength Division Multiplexing," *IEEE Communications Magazine* 35(4):82-88 (1997).
Bischoff, M. et al., "Operation and Maintenance for an All-optical Transport Network," IEEE Communications Magazine, vol. 34, No. 11, Nov. 1996, pp. 136-142.
Brezden, B.L. and Gardner, D.R., "The Effect of Some Frescon Analogs on the Aquatic Snail, *Lymnaea stagnalis*," *Pesticide Biochemistry and Physiology* 13(2):189-197 (1980).
Bruyère, F., "Impact of first- and second-order PMD in optical digital transmission systems," *Optical Fiber Tech.* 2(33):269-280 (1996).
Calvani, R. et al., "Real-time heterodyne fiber polarimetry with narrow- and broad-band sources," *J. Lightwave Tech.* 4(7):877-883 (1986).
Caspar, C. et al., "Automatic Switching System in Optical Heterodyne Technique," European Conference on Optical Communication (ECOC), Helsinki, vol. 1, Conf. 13, pp. 317-320 (Sep. 13, 1987).
Clesca, B. et al., "Impact of polarization mode dispersion on 10 Gbit/s terrestrial systems over non-dispersion-shifted fibre," *Electronics Lett.* 31(18):1594-1595 (1995).
Fastie, W.G., "A Small Plane Grating Monochromator," *J. Opt. Soc. Am.* 42(9):641-647 (1952).
Fastie, W.G., "Ebert Spectrometer Reflections," *Physics Today*, pp. 37-43 (Jan. 1991).

Galtarossa, A. et al., "Experimental investigation of polarization mode dispersion in single-mode fibers using a new backscattering technique," OFC '98 Technical Digest, p. 343 (1998).
Gisin, N. and Huttner, B., "Combined effects of polarization mode dispersion and polarization dependent losses in optical fibers," *Optics Commun.* 142:119-125 (1997).
Hakki, B.W., "Polarization Mode Dispersion Compensation by Phase Diversity Detection," *IEEE Photonics Tech. Lett.* 9(1):121-123 (1997).
Heebner, J.E. et al., "Conversion of unpolarized light to polarized light with greater than 50% efficiency by photorefractive two-beam coupling," *Optics Lett.* 25(4):257-259 (2000).
Heffner, B., "Automated measurement of polarization mode dispersion using Jones Matrix Eigenanalysis," *IEEE Photonics Tech. Lett.* 4(7):1066-1069 (1992).
Heffner, B., "Accurate, automated measurement of differential group delay dispersion and principal state variation using Jones Matrix Eigenanalysis," *IEEE Photonics Tech. Lett.* 5(7):814-817 (1993).
Hinton, K., "Dispersion compensation using apodized Bragg fiber gratings in transmission," *J. Lightwave Tech.* 16(12):2336-2346 (1998).
Kohtoku, M. et al., "Packaged polarization-insensitive WDM monitor with low loss (7.3 dB) and wide tuning range (4.5 nm)," *IEEE Photonics Tech. Lett.* 10(11):1614-1616 (1998).
Kudou, T. et al., "Theoretical basis of polarization mode dispersion equalization up to the second order," *J. Lightwave Tech.* 18(4):614-617 (2000).
Ky, N.H. et al., "Efficient broadband intracore grating $LP_{01}$-$LP_{02}$ mode converters for chromatic-dispersion compensation," *Optics Lett.* 23(6):445-447 (1998).
Litchinitser, N.M. et al., "Dispersion of cascaded fiber gratings in WDM lightwave systems," *J. Lightwave Tech.* 16(8):1523-1529 (1998).
May, R.D., "Correlation-based Technique for Automated Tunable Diode Laser Scan Stabilization," *Rev. Sci. Instrum.* 63(5):2922-2926 (1992).
Noé, R. et al., "Polarization mode dispersion compensation at 10, 20, and 40 Gb/s with various optical equalizers," *J. Lightwave Tech.* 17(9):1602-1616 (1999).
Okoshi, T. et al., "New polarisation-control scheme for optical heterodyne receiver using two faraday rotators," *Electronics Lett.* 21(18):787-788 (1985).
Otsuka, K. et al., "A high-performance optical spectrum monitor with high-speed measuring time for WDM optical networks," ECOC 97, Conf. Publ. No. 448, vol. 2, pp. 147-150 (Sep. 22, 1997).
Ozeki, T. and Kudo, T., "Adaptive equalization of polarization-mode dispersion," in *Technical Digest, Conference on Optical Fiber Communication/International Conference on Integrated Optics and Optical Fiber Communication*, 1993 Technical Digest Series, vol. 4, pp. 143-144 (1993).
Poole, C.D. et al. "Fading in Lightwave Systems Due to Polarization-Mode Dispersion," *IEEE Photonics Technology Lett.* 3(1):68-70 (1991).
Pua, H.Y. et al., "An adaptive first-order polarization-mode dispersion compensation system aided by polarization scrambling: Theory and demonstration," *J. Lightwave Tech.* 18(6):832-841 (2000).
Rosenfeldt, H. et al., "PMD compensation in 10 Gbits/s NRZ field experiment using polarimetric error signal," *Electronic Lett.* 36(5):448-450 (2000).
Schröder, G., *Technische Optik: Grundlagen und Anwendungen*, Vogel-Verlag Publishers, pp. 177-178 (1990).
Shimizu, H. and Kaede, K., "Endless polarisation controller using electro-optic waveplates," *Electronics Lett.* 24(7):412-413 (1988).
Shimizu, H. et al. "Highly Practical Fiber Squeezer Polarization Controller," *J. Lightwave Tech.* 9(10):1217-1224 (1991).
Teshima, M. and Koga, M., "100-GHz-spaced 8-channel frequency control of DBR lasers for virtual wavelength path cross-connect system," *IEEE Photonics Tech. Lett.* 8(12):1701-1703 (1996).
Zhong, S. et al., "Full-coverage multichannel wavelength-monitoring circuit for WDM system," Conference on Lasers and Electro-optics (CLEO), Technical Digest Series, vol. 6, pp. 28-29 (May 3, 1998).

Office Action mailed Aug. 2, 2005 for U.S. Appl. No. 09/807,950, 10 pages.
Response to Office Action filed Dec. 1, 2005 for U.S. Appl. No. 09/807,950, 11 pages.
Final Office Action mailed Feb. 23, 2006, for U.S. Appl. No. 09/807,950, 10 pages.
International Search Report for PCT/DE00/03809, dated Apr. 4, 2001, 5 pages.
Office Action mailed Feb. 23, 2006 for U.S. Appl. No. 11/302,015, 16 pages.
Official Action by German Patent Office for Appl. No. 198 25 876.3, dated Jan. 27, 2003, with translation, 6 pages.
Official Action by German Patent Office for Appl. No. 198 25 876.3, dated Aug. 12, 2004, with translation, 5 pages.
Reply to Official Action in Appl. No. 198 25 876.3, dated Jan. 17, 2005, with translation, 9 pages.
Office Action mailed Aug. 29, 2002 for U.S. Appl. No. 09/806,704, 10 pages.
Response to Office Action filed Nov. 27, 2002 for U.S. Appl. No. 09/806,704, 53 pages.
Final Office Action mailed Feb. 27, 2003 for U.S. Appl. No. 09/806,704, 14 pages.
Response to Final Office Action filed Apr. 7, 2003 for U.S. Appl. No. 09/806,704, 18 pages.
Advisory Action mailed Apr. 21, 2003 for U.S. Appl. No. 09/806,704, 3 pages.
Amendment with RCE filed Aug. 18, 2003 for U.S. Appl. No. 09/806,704, 11 pages.
Amendment after Appeal filed Aug. 19, 2003 for U.S. Appl. No. 09/806,704, 4 pages.
Office Action mailed May 25, 2004 for U.S. Appl. No. 09/806,704, 14 pages.
Response to Office Action filed Oct. 25, 2004 for U.S. Appl. No. 09/806,704, 15 pages.
Final Office Action mailed Jan. 11, 2005 for U.S. Appl. No. 09/806,704, 15 pages.
Amendment after Final filed Jun. 10, 2005 for U.S. Appl. No. 09/806,704, 10 pages.
Notice of Allowance mailed Jul. 1, 2005 for U.S. Appl. No. 09/806,704, 8 pages.
EPO Reply to Examination Report filed in EP Appl. No. 99 950 610.8 on Aug. 7, 2002, 10 pages.
International Preliminary Examination Report for PCT/EP99/07340, dated Jan. 18, 2001, 8 pages.
International Search Report for PCT/EP99/07340, dated Apr. 13, 2000, 9 pages.
Preliminary Amendment filed Oct. 3, 2005 for U.S. Appl. No. 11/242,819, 37 pages.
EPO Search Report issued in EP Appl. No. 02 017 938.8 on Apr. 4, 2005, 5 pages.
Office Action mailed Mar. 18, 2004, for U.S. Appl. No. 09/936,469, 8 pages.
Response to Office Action filed Dec. 8, 2004, for U.S. Appl. No. 09/936,469, 14 pages.
Notice of Allowance mailed Feb. 7, 2005, for U.S. Appl. No. 09/936,469, 7 pages.
EPO Examination Report issued in EP 00 926 668.5, dated Aug. 28, 2002, with translation, 6 pages.
Reply to JPO Office Action in JP 2000-604252, dated Jul. 12, 2005, with translation, 3 pages.
International Preliminary Examination Report for PCT/DE00/00722, dated Dec. 21, 2000, 7 pages.
International Search Report for PCT/DE00/00722, dated Aug. 17, 2000, 6 pages.
Notice of Allowance mailed Mar. 2, 2005, for U.S. Appl. No. 09/979,567, 11 pages.
Office Action mailed Oct. 17, 2005, for U.S. Appl. No. 09/979,567, 13 pages.
EPO First Examination Report for EP 00 940 143.1, dated Jul. 17, 2002, with translation, 10 pages.
EPO Second Examination Report for EP 00 940 143.1, dated Jul. 18, 2003, with translation, 10 pages.
Japanese Patent Office Rejection for JP Appl. No. 2000-617587, dated Nov. 30, 2004, with translation, 7 pages.
Reply to Japanese Patent Office Rejection for JP Appl. No. 2000-617587, dated Jul. 20, 2005, with translation, 6 pages.
International Preliminary Examination Report for PCT/DE00/01267, dated Dec. 21, 2000, 7 pages.
International Search Report for PCT/DE00/01267, dated Sep. 18, 2000, 4 pages.
Office Action mailed May 21, 2004, for U.S. Appl. No. 10/204,812, 8 pages.
Response to Office Action filed Oct. 21, 2004, for U.S. Appl. No. 10/204,812, 6 pages.
Notice of Allowance mailed Dec. 21, 2004, for U.S. Appl. No. 10/204,812, 11 pages.
Letter from foreign associate enclosing DE Examination Report with English translation in DE Appl. No. 100 33 819.4, dated Mar. 31, 2006, 30 pages.
EPO Examination Report for EP 01 929 227.5, dated Mar. 21, 2005, with translation, 4 pages.
Reply to EPO Examination Report for EP 01 929 227.5, dated Jul. 6, 2005, with translation, 9 pages.
International Preliminary Examination Report for PCT/DE01/00814, dated Jun. 19, 2002, with translation, 10 pages.
International Search Report for PCT/DE01/00814, dated Aug. 6, 2001, 6 pages.
Office Action mailed Jun. 17, 2004, for U.S. Appl. No. 09/849,080, 14 pages.
Response to Office Action filed Nov. 15, 2004, for U.S. Appl. No. 09/849,080, 14 pages.
Notice of Allowance mailed Feb. 11, 2005, for U.S. Appl. No. 09/849,080, 5 pages.
EPO Examination Report issued in EP Appl. No. 01 943 025.5, dated Jan. 17, 2005, with translation, 4 pages.
Reply to EPO Examination Report for EP 01 943 025.5, dated Apr. 13, 2005, with translation, 10 pages.
International Preliminary Examination Report for PCT/DE01/01716, dated Aug. 2, 2002, with translation, 7 pages.
International Search Report for PCT/DE01/01716, dated Feb. 11, 2002, 8 pages.
Notice of Allowance mailed Jul. 8, 2002, for U.S. Appl. No. 09/849,081, 8 pages.
Response to EPO Office Action in Appl. No. 01 947 131.7, dated Apr. 18, 2006. In German, with English cover letter and claim, 11 pages.
International Preliminary Examination Report for PCT/DE01/01709, dated Oct. 7, 2002, 4 pages.
International Search Report for PCT/DE01/01709, dated Mar. 26, 2002, 6 pages.
German Office Action for Appl. No. 100 49 784.5, dated Aug. 6, 2001, with translation, 13 pages.
Reply to German Office Action, for Appl. No. 100 49 784.5, dated Feb. 25, 2003, with translation, 37 pages.
Second German Office Action for Appl. No. 100 49 784.5, dated Aug. 12, 2004, with translation, 17 pages.
Reply to Second German Office Action for Appl. No. 100 49 784.5, dated Feb. 25, 2005, with translation, 25 pages.
German Office Action for Appl. No. 100 55 189.0, dated Jul. 18, 2002, with translation, 3 pages.
Reply to German Office Action for Appl. No. 100 55 189.0, dated Jan. 29, 2003, with translation, 23 pages.
Reply to German Office Action, for Appl. No. 101 16 855.1, dated Apr. 13, 2005, with translation, 7 pages.
Notice of Allowance mailed Jan. 6, 2004, for U.S. Appl. No. 10/228,675, 9 pages.
EPO Supplementary Search Report for Appl. No. 01 12 0361, dated Feb. 12, 2002, 3 pages.
Notice of Allowance mailed Aug. 26, 2004, for U.S. Appl. No. 10/398,273, 9 pages.
Notice of Allowance mailed Oct. 5, 2004, for U.S. Appl. No. 10/398,273, 6 pages.
RCE and Amendment filed Nov. 8, 2004, for U.S. Appl. No. 10/398,273, 12 pages.

Notice of Allowance mailed Feb. 11, 2005, for U.S. Appl. No. 10/398,273, 7 pages.
Notice of Allowance mailed Aug. 9, 2005, for U.S. Appl. No. 10/398,273, 15 pages.
EPO Examination Report for Appl. No. 01 986 813.2, dated Oct. 6, 2004, with translation, 7 pages.
Reply to EPO Examination Report for Appl. No. 01 986 813.2, dated Feb. 4, 2005, with translation, 19 pages.
EPO Second Examination Report for Appl. No. 01 986 813.2, dated Dec. 19, 2005, with translation, 4 pages.
Reply to Second EPO Examination Report for Appl. No. 01 986 813.2, dated Jan. 20, 2006, with translation, 5 pages.
International Search Report for PCT/EP01/10794, dated Feb. 22, 2002, 6 pages.
International Preliminary Examination Report for PCT/EP01/10794, dated Jun. 3, 2002, 4 pages.
Office Action mailed Apr. 24, 2003, for U.S. Appl. No. 10/147,143, 9 pages.
Response to Office Action filed Oct. 23, 2003, for U.S. Appl. No. 10/147,143, 13 pages.
Final Office Action mailed Feb. 18, 2004, for U.S. Appl. No. 10/147,143, 10 pages.
Amendment after Final filed May 18, 2004, for U.S. Appl. No. 10/147,143, 5 pages.
Notice of Allowance mailed Jun. 9, 2004, for U.S. Appl. No. 10/147,143, 7 pages.

Supplemental Notice of Allowance mailed Jul. 27, 2004, for U.S. Appl. No. 10/147,143, 4 pages.
EPO Search Report for Appl. No. 02 010 847.8, dated Jun. 18, 2003, 6 pages.
EPO Examination Report for Appl. No. 02 010 847.8, dated Oct. 22, 2003, with translation, 7 pages.
Reply to EPO Examination Report for Appl. No. 02 010 847.8, dated Feb. 13, 2004, with translation, 20 pages.
EPO Second Examination Report for Appl. No. 02 010 847.8, dated Mar. 18, 2004, with translation, 15 pages.
Reply to EPO Second Examination Report for Appl. No. 02 010 847.8, dated Sep. 16, 2004, with translation, 18 pages.
Notice of Allowance mailed Feb. 11, 2005, for U.S. Appl. No. 10/406,693, 10 pages.
EPO Search Report for Appl. No. 03 002 980.5, dated Apr. 29, 2003, 3 pages.
EPO Examination Report for Appl. No. 03 002 980.5, dated Nov. 6, 2003, with translation, 7 pages.
Reply to EPO Examination Report for Appl. No. 03 002 980.5, dated Mar. 5, 2004, with translation, 17 pages.
EPO Second Examination Report for Appl. No. 03 002 980.5, dated Jun. 2, 2004, with translation, 6 pages.
Reply to EPO Second Examination Report for Appl. No. 03 002 980.5, dated Nov. 23, 2004, with translation, 18 pages.

\* cited by examiner

FIBER POLARIMETER, THE USE THEREOF, AS WELL AS POLARIMETRIC METHOD

This is a continuation of application Ser. No. 10/147,143, filed May 15, 2002 now U.S. Pat. No. 6,816,260, which is incorporated herein by reference.

BACKGROUND OF THE INVENTION

The present invention relates to a polarimeter in an all-fiber configuration, and more particularly to an assembly for determining the polarization, the degree of polarization and the power of light guided in a glass fiber, the use thereof, as well as a polarimetric method.

Light is an electromagnetic wave, the electric field strength components of which are oscillating with the optical angular frequency $\Omega$ in the x-y plane orthogonal to the propagation direction z. Each wave may be separated into 2 orthogonal partial waves, the amplitudes and phase relationships of which uniquely describe the polarization.

In the case of linear partial waves:

$$E(t)=[E_x \cos(\Omega t+\phi_x), E_y \cos(\Omega t+\phi_y)][e_x, e_y]$$

A polarization variation is caused by a variation in the phase difference $\Delta\phi=\phi_y-\phi_x$ or by a variation in the ratio of amplitudes.

For describing the polarization, several equivalent parameters are usual. Aside from the parameters of the polarization ellipse, azimuth $\theta$ and ellipticity angle $\epsilon$, the normalized Stokes parameters $s_1$, $s_2$, $s_3$ are widespread. A complete description of even only partially polarized light waves gives the Stokes parameters $S_0$, $S_1$, $S_2$ and $S_3$. From these the normalized Stokes parameters $s_1$, $s_2$, $s_3$ are derivable for describing the polarization state, the degree of polarization and the total power.

The refractive index n of a wave plate is direction-dependent. Therefore, the generally linear partial waves experience different phase velocities and obtain a phase difference.

A polarizer attenuates the partial wave in its blocking direction considerably more than the orthogonal component in its transmission direction. Therefore, the transmitted power becomes polarization-dependent and a simple detection of the polarization is realized.

The use of a polarimeter and a polarimetric method, respectively, has the following application fields:
Determining the degree of polarization (DOP)
Determining the degree of polarization (DOP) as a control signal in a polarization mode dispersion (PMD) compensator
Determining the polarization-dependent attenuation and loss (PDL), respectively, of optical fibers and components
Determining the polarization mode dispersion (PMD) of optical fibers and components
Analysis of birefringent and polarizing materials
Determining the extinction ratio (ER) in polarization maintaining fibers
Evaluation of sensors on a polarimetric basis (e.g. Faraday current sensor)
Extraction of control signals in automatic polarization controllers and many other things.

Aside from "complete polarimeters", which detect all of the four Stokes parameters, there are means that determine only the deviation of the polarization state from a desired polarization state. This may be realized by simple polarizers, polarization beam splitters, etc.

The polarization of the light may be described mathematically by means of the Stokes vector. The Stokes vector is completely determined by the four Stokes parameters $S_0 \ldots S_3$. The Stokes parameters are defined as follows: $S_0$ (absolute power), $S_1$ (linearly horizontally polarized component less the linearly vertically polarized component), $S_2$ (linearly 45° polarized component less the linearly -45° polarized component), $S_3$ (right-handed circularly polarized component less the left-handed circularly polarized component).

For determining the polarization state, the degree of polarization and the power of the light, all four parameters of the Stokes vector have to be determined.

A polarimeter in the form of an assembly having a rotating wave plate in combination with a polarizer fixedly arranged in front of a detector is known. From the detected signal, the four Stokes parameters may be determined. However, the mechanically moving parts limit the measurement result speed.

There are also known various polarimeter assemblies, using beam splitters, polarization beam splitters, polarizers and wave plates, which separate the incident light beam such that the four Stokes parameters may be determined with at least four correspondingly disposed detectors. However, these assemblies normally require a high adjustment effort, see T. Pikaar et al.: Fast complete polarimeter for optical fibres; E-FOC 1989.

Another disadvantage of the assemblies mentioned above is the fact that with these assemblies an inline measurement, namely a determination of the polarization characteristics of the light guided in the glass fiber, usually is not possible. So-called fiber polarimeters or inline polarimeters avoid this disadvantage.

There are known various embodiments of fiber polarimeters. In the patent specification (U.S. Pat. No. 5,815,270) an assembly having a 1×5 fusion coupler as well as succeeding polarizers and wave plates is disclosed.

Another known assembly is presented in R. M. A. Azzam: Inline light saving photopolarimeter and its fiber optic analog; Optic Letters, Vol. 12, No. 8, pp. 558–560, 1987 where polarization-dependent couplers are used for determining the Stokes parameters.

Another known assembly is presented in M. A. Habli: Experimental implementation of a fiber optic four detector photopolarimeter; Optik, Vol. 110, No. 9, pp. 433–435, 1999. There partially ground fibers are used to couple a polarization-dependent portion of the light out of the fiber.

The patent specification (U.S. Pat. No. 6,211,957B1) discloses another assembly of a fiber polarimeter. According to this, oblique fiber Bragg gratings are used, where the grating period and the angle between grating plane and fiber axis are selected such that light can couple from the guided fundamental mode into a radiation mode. This coupling is highly polarization-dependent. For determining the four Stokes parameters four differently oriented gratings are used where, in addition to the discrimination between right-handed circularly and left-handed circularly polarized light, a UV-induced wave plate is interposed. UV-induced birefringence is described in T. Erdogan et al.: Characterization of UV-induced birefringence in photo-sensitive Ge-doped silica optical fibers; J. Opt. Soc. Am. B/Vol. 11, No. 10, pp. 2100–2105, 1994. The generation of birefringence by bending the glass fiber is described in R. Ulrich et al.: Bending-induced birefringence in single-mode fibers; Optics Letters, Vol. 5, No. 6, June 1980.

This solution is disadvantageous in that the fiber Bragg gratings have to be inscribed with four different orientations to the fiber axis (0°, 90° and 45°, 135°). In manufacturing the fiber Bragg gratings, this may be achieved by an appropriate rotation of the glass fiber about the fiber axis, but is associated with considerable effort. This also implies that the individual fiber Bragg gratings couple out light in four different directions. Thus, the use of planar detector rows or detector arrays is not possible.

Another disadvantage is the asymmetry of the coupled-out polarization components. With respect to the input, the polarization states linear 0°, linear 45° and linear 90° as well as a nearly circular polarization are coupled out. This assembly inevitably causes polarization-dependent losses (PDL) of the whole assembly, since the PDL of the individual gratings (components of the light intensity of a certain polarization direction are coupled out of the fiber) do not compensate for each other. Further, with three linear polarization states and an approximately circular polarization state, in the analysis of any polarization state the optimum cannot be achieved when real detector currents are evaluated.

What is desired is a technologically simpler and cheaper fiber polarimeter having better quality characteristics, the use thereof, as well as a corresponding polarimetric method.

BRIEF SUMMARY OF THE INVENTION

According the present invention provides that fiber Bragg gratings are inscribed at a certain angle to a fiber axis such that at each grating two portions of the light, depending on the polarization, are coupled out of the fiber. This radiated light has two spatially separated intensity maximums occurring in different polarization states, which are detected or can be detected, respectively, by means of an appropriate number of detectors or preferably detector pairs. The manufacture of such fiber Bragg gratings is preferably performed by UV-induced refractive index modulation in the core of the glass fiber. In one embodiment, the interference pattern required for this is generated by means of an appropriate phase mask, wherein the phase mask is disposed at a certain angle to the fiber axis. Generally, a single-mode standard fiber is used. However, a glass fiber having a special refractive index and doping profile may be used to increase the coupling-out efficiency, to optimize the difference of the coupled-out polarization states, or to improve the extinction ratio (ER) of the polarization states thus being coupled out.

In one configuration of the assembly the fiber polarimeter has at least two special fiber Bragg gratings and an interposed wave plate. The fiber Bragg gratings may be differently oriented with respect to the fiber axis. In this assembly, preferably only two (instead of four) fiber Bragg gratings are required. The two powers coupled out by each grating, depending on the polarization, are each detected by one detector pair and converted to an electrical signal. For example, the two polarization states that a fiber Bragg grating couples out can be 0° linearly polarized and 90° linearly polarized. These signals are detected by appropriate hardware and further processed by software. From these data, by means of an algorithm and with regard to calibration data, the Stokes parameters are determined. Preferably photodiodes having an appropriate spectral sensitivity are used as detectors. The detectors, preferably detector pairs, are arranged such that their positions and sizes correspond to the position and size of the two spatially separated maximums of the coupled-out light. Since each fiber Bragg grating couples out two different polarization states and radiates in spatially different angles, the use of double photodiodes as the detectors is feasible.

In another embodiment of the assembly the detectors, or preferably the detector pairs, are disposed as close to the fiber as possible in order to achieve a signal intensity as high as possible. Another improvement of the signal intensity and the suppression of interfering Fabry-Perot effects may be achieved by avoiding the glass-air junction at the fiber surface and the beam spreading associated therewith because of the lens effect. The wave plates required in the assemblies may be produced by bending the glass fiber.

Further configurations are UV-induced birefringence, the use of a section of a birefringent glass fiber (polarization maintaining glass fiber), or the generation of birefringence by compressive loading the glass fiber. Generally, only a small portion of the light is coupled out by the fiber Bragg gratings, so that the insertion attenuation of the assembly is very low. But, since the coupled-out power is polarization-dependent, the assembly may have a low polarization-dependent loss (PDL). In individual gratings similarly tainted with PDL, the PDL is avoided by appropriate selection of the coupled-out polarization states and appropriate parameters for the wave plate. Of the totally four coupled-out polarization states, the polarization states coupled out by the same fiber Bragg grating respectively yield a polarization average value. If the average values of the coupled-out polarization states of the two fiber Bragg gratings are orthogonal to each other, then the polarization-dependent losses of the whole assembly compensate for each other and the whole assembly does not have a PDL.

Alternatively, a further fiber Bragg grating may be disposed succeeding each fiber Bragg grating of the assemblies, the parameters of which are identical, the orientation of which is orthogonal to the existing fiber Bragg grating, so that the polarization-dependent losses of one fiber Bragg grating are compensated for by a succeeding fiber Bragg grating.

In yet another embodiment of the assembly the gratings are inscribed in slightly birefringent (polarization maintaining) glass fiber. In this assembly the section of the fiber located between the gratings has the function of the wave plate.

Another embodiment results if the assembly is used for the generation of a control signal for the polarization-correct coupling into the principal axis of a polarization maintaining fiber. For this, the polarization maintaining fiber is disposed directly at the output, i.e. immediately after the last grating. In this variant, the orientation of the principal axes of the polarization maintaining fiber may be any with respect to the orientation of the gratings. Advantageously, the calibration of this assembly as a polarimeter is performed such that the polarization is measured with respect to the principal axes of the slightly birefringent (polarization maintaining) fiber.

In a further embodiment of the assembly for extraction of a control signal for the polarization-correct coupling into a polarization maintaining fiber, only one fiber Bragg grating is used, where the orientation of the two polarization states coupled out by the grating does not have to coincide exactly with one of the principal axes of the birefringent fiber. This fact allows for greater manufacturing tolerances in the angle adjustment between the principal axes of the polarization maintaining fiber and the coupled-out polarization states. From the two detector currents, a control signal may be generated, which provides a maximum output for the two coupled-out polarization states when coupling into the principal axis of the polarization maintaining fiber occurs. The achievable quality for the optimum coupling into the polarization maintaining fiber, expressed as the extinction ratio (ER), thereby may be substantially increased over conventional assemblies. For the operation of this assembly, it doesn't matter whether the fiber Bragg grating is disposed immediately in front of the polarization maintaining fiber or in the same.

The objects, advantages and other novel features of the present invention are apparent from the following detailed description when read in conjunction with the appended claims and attached drawing.

DETAILED DESCRIPTION OF THE INVENTION

Figure 1:
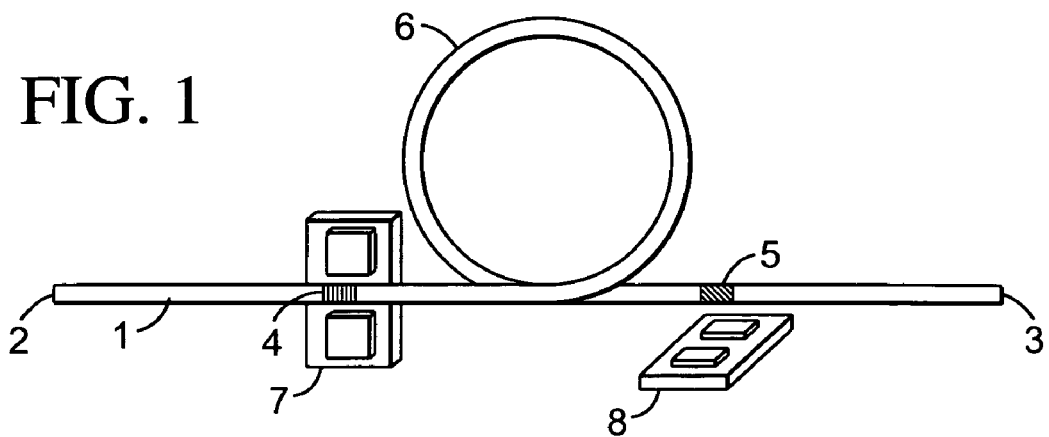
FIG. 1 is a simple diagrammatic view of a fiber polarimeter according to the present invention with the generation of a wave plate function being implemented by bending a fiber (fiber loop).

Referring now to FIG. 1, a fiber polarimeter for determining the polarization characteristics of light guided in a glass fiber includes a glass fiber 1 with an input 2 and an output 3. The core of the glass fiber 1 has two special fiber Bragg gratings 4, 5, the orientations of which are arranged 90° offset. Fiber Bragg gratings result by varying the structure of the core of light-guiding glass fibers. Here, grating structures, as zones of different refractive indices in the glass fiber core, are preferably generated photorefractively by means of a high performance UV laser. The illuminated portion of the fiber acts as a diffraction grating ("gratings"). Therefore, fiber Bragg gratings may serve as fiber-optic components reflecting light having a certain wavelength, while all the remaining wavelengths are transmitted. The reflection of the light is effected by the generated periodic refractive index structure within the light-guiding fiber. Between the fiber Bragg gratings 4, 5 a λ/4 wave plate 6 is disposed, which is produced in this embodiment by fiber bending, the one principal axis of which coincides with the orientation of the first fiber Bragg grating 4, and the second principal axis of which coincides with the orientation of the second fiber Bragg grating 5. Moreover, the assembly has two detector pairs 7, 8 serving to determine the signal components coupled out and radiated by the fiber Bragg gratings 4, 5. Furthermore, an adaptation of refractive index (not shown) may be provided between the fiber Bragg gratings 4, 5 and the detector pairs 7, 8.

In the operation of the fiber polarimeter the light coupled to the input 2 of the glass fiber 1 is guided in the core thereof to the first fiber Bragg grating 4. The fiber Bragg grating 4 has the property of coupling two small portions of the light intensity out of the glass fiber 1. This property is determined by the parameters of core refractive index of the glass fiber 1, UV-induced refractive index modulation as well as distance, angle and shape of the grating lines of the fiber Bragg grating 4. With appropriate selection of these parameters, the coupling-out efficiency and the intensity distribution of the radiated light depend on the polarization of the coupled-in light. A great portion of the light passes the fiber Bragg grating 4 and arrives at the wave plate 6. By means of the wave plate 6 a change in the state of polarization is effected. The light thus changed arrives at the second fiber Bragg grating 5. The function thereof is identical to the fiber Bragg grating 4, i.e. it has identical coupling-out efficiencies and intensity distributions. With respect to their individual orientations, the coupled-out polarization states do not differ. But, since the second fiber Bragg grating 5 is disposed perpendicularly to the orientation of the first grating 4, and by means of the wave plate 6 an additional polarization rotation occurs, the polarization states coupled out by the first fiber Bragg grating 4 differ from the polarization states coupled out by the second fiber Bragg grating 5 with respect to the fiber input 2.

By means of suitably dimensioned detector pairs 7, 8, adjusted according to the intensity maximums and fixedly connected to the glass fiber, the intensity of the coupled-out signal portions is determined. By an adaptation of refractive indices between glass fiber 1 and the detector pairs 7, 8, interfering Fabry-Perot effects are avoided. From the four detector signals of the two detector pairs 7, 8, by means of an appropriate algorithm and with regard to calibration data, the four Stokes parameters are determined which uniquely describe the polarization state, the degree of polarization and the power of the light guided in the glass fiber 1.

The accuracy of the fiber polarimeter achievable under real measurement conditions (e.g. in the presence of noise, drift, A/D error) greatly depends on the determinant of the instrument matrix. The instrument matrix M establishes the mathematically exact relation between the measured currents $I_0$ to $I_3$ and the Stokes parameters $S_0$ to $S_3$ to be determined.

$$[S_0, S_1, S_2, S_3] = [m_{00}, m_{01}, m_{02}, m_{03}; m_{10}, m_{11}, m_{12}, m_{13}; m_{20}, m_{21}, m_{22}, m_{23}; m_{30}, m_{31}, m_{32}, m_{33}]^* [I_0, I_1, I_2, I_3];$$

$$S = M^* I$$

The determinant of the instrument matrix M allows a statement about the stability of the calculated polarization values (polarization, DOP and power) with variation of the measured four detector currents. For stable measurement values a maximally high determinant is advantageous.

Figure 8:
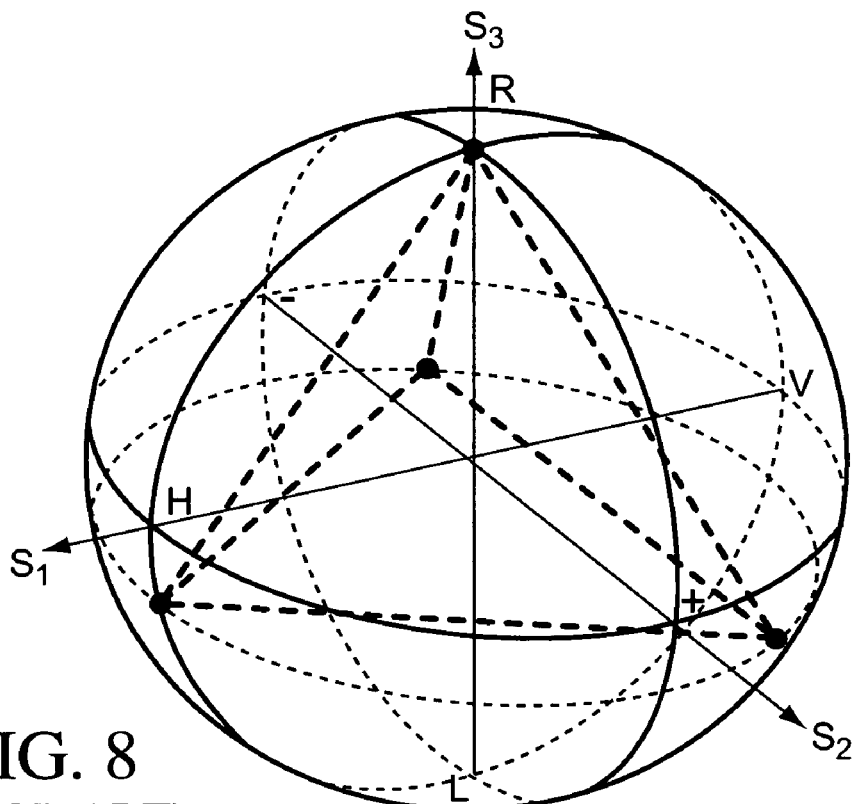
FIG. 8 is a diagrammatic view of an optimal distribution of the coupled-out polarization states on a Poincaré sphere according to the prior art.

In R. M. A. Azzam et al.: General analysis and optimization of the four-detector photopolarimeter, J. Opt. Soc. Am., Vol. 5, No. 5, May 1988 as optimum polarizations right-handed circular and three left-handed elliptical polarizations with the ellipticity angle −9.736° and the azimuthal angles 0°, 60° and −60° are mentioned. These four polarizations constitute the corner points of a pyramid having the greatest possible volume that can be inscribed within a Poincaré sphere, as shown in FIG. 8. This characteristic implies at the same time the maximum determinant of the instrument matrix of the polarimeter and the greatest possible stability of the measurement values.

Figure 9:
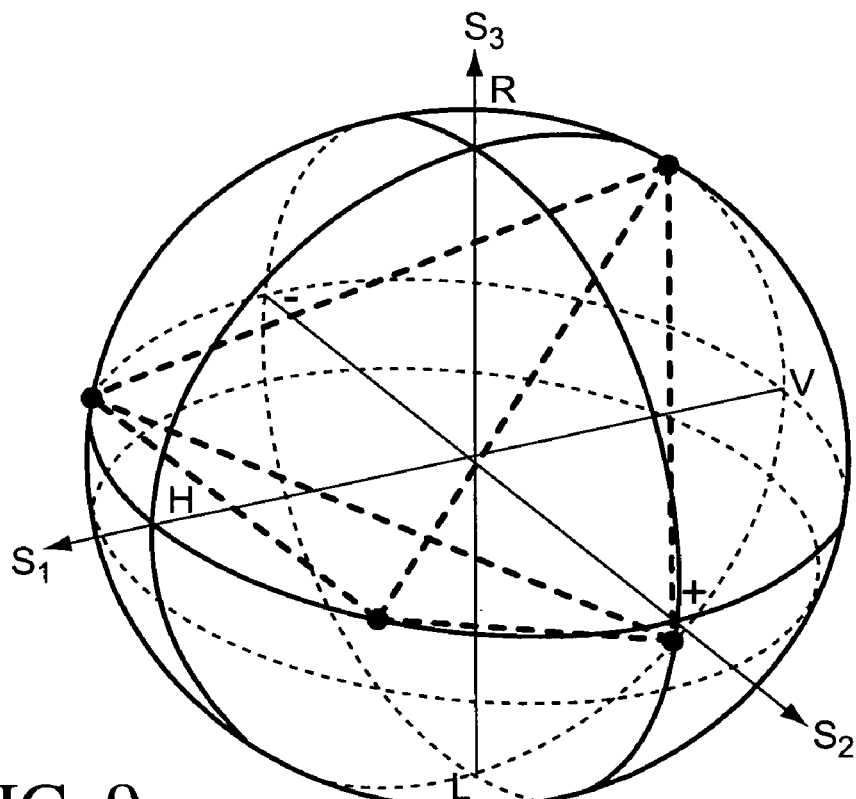
FIG. 9 is a diagrammatic view of an optimum distribution of the coupled-out polarization states on a Poincaré sphere according to the present invention.

The fiber polarimeter of FIG. 1, with the appropriate selection of the grating and wave plate parameters, may achieve this theoretical maximum. The optimal wave plate has a delay of $\lambda/4 = 90°$. The optimal fiber Bragg gratings each couple out two linear polarizations, which have a physical orientation of ±27.3675° to the principal axes of the wave plate (0°/90°). With respect to the input, two linear polarizations with ±(2*27.3675°) azimuthal angle, and two elliptical polarizations with the ellipticity angles ±(2*27.3675°) and an azimuth of 90° result, as shown in FIG. 9.

In this configuration, the volume of the resulting pyramid, the determinant of the instrument matrix M and the stability of the measurement values are identical to those of Azzam et al., since in both configurations all of the four polarizations are separated from each other by a spatial angle of 109.47°. Due to the low polarization-dependent coupling-out of light by the fiber Bragg gratings, the polarization-dependent loss (PDL) is low. For example, the absence of PDL in the fiber polarimeter of FIG. 1 is achieved if the first fiber Bragg grating 4 couples out two linear polarization states disposed symmetrically to the horizontal axis, and the second fiber Bragg grating 5 couples out two elliptical polarization states disposed symmetrically to the vertical axis with respect to the input.

Figure 2A:
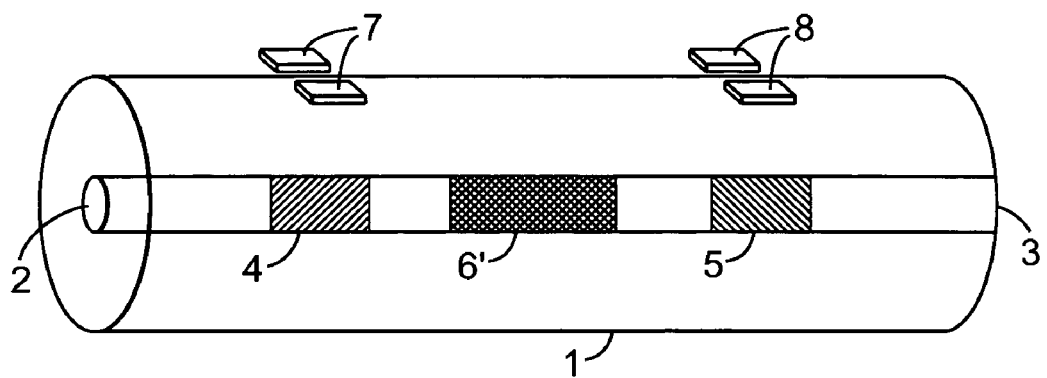
FIGS. 2a and 2b are diagrammatic views of further embodiments of a fiber polarimeter according to the present invention with a UV-induced wave plate.
Figure 2B:
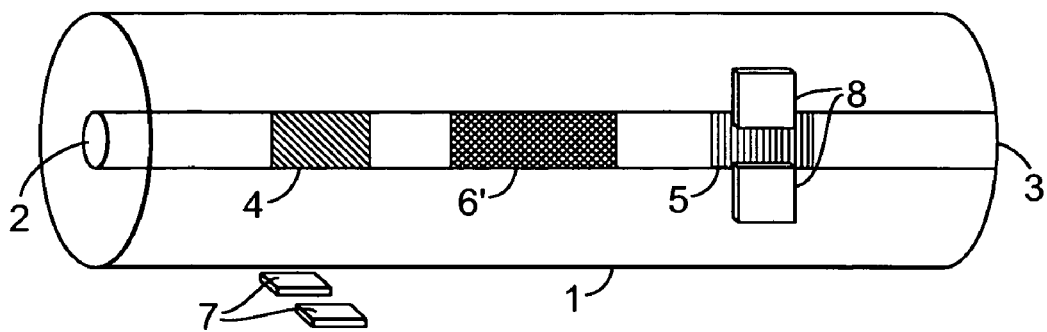

FIGS. 2a and b show another preferred embodiment of the fiber polarimeter which differs from FIG. 1 only in that the wave plate 6 is configured as an UV-induced wave plate 6'. In FIG. 2a, the principal axes of the wave plate 6' are oriented such that they coincide with the average value of the two polarization states coupled out by the first fiber Bragg grating 4 and with the average value of the two polarization states coupled out by the second fiber Bragg grating 5. In FIG. 2b the orientation of the principal axes are horizontal and vertical. In FIG. 2b, the fiber polarimeter with mutually orthogonal coupling-out directions of the two fiber Bragg gratings is illustrated, while FIG. 2a illustrates another, but not optimal configuration.

Figure 3:
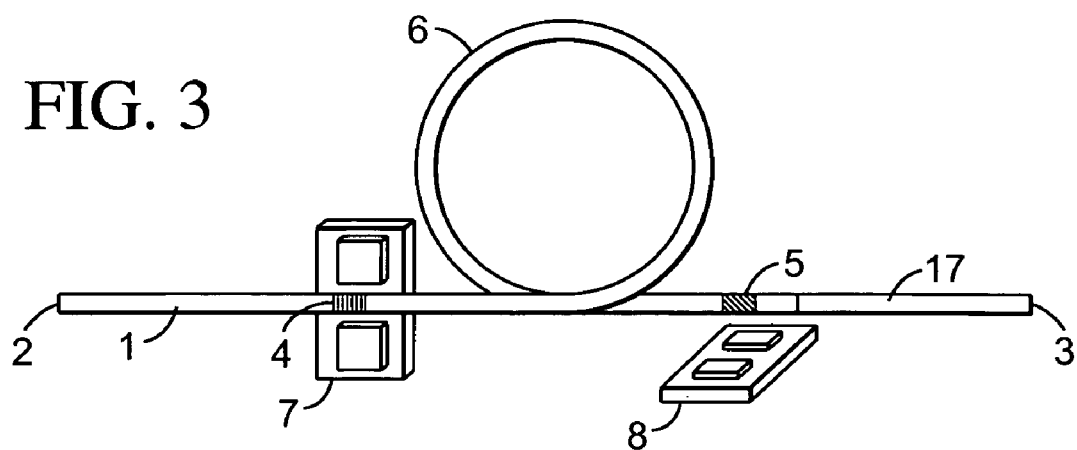
FIG. 3 is a diagrammatic view of yet another embodiment of a fiber polarimeter according to the present invention with a polarization maintaining fiber (PMF) as an output fiber.

FIG. 3 shows another preferred embodiment of the fiber polarimeter where the output fiber 17 is configured as a polarization maintaining fiber. In this case, the fiber polarimeter may be used for extracting control signals for the polarization-correct coupling into the principal axis of the polarization maintaining fiber 17. Therefore the variation of the polarization state may be effected by a polarization controller, preceding the fiber polarimeter and driven by the control signal. Since the measurement of the polarization is effected immediately in front of the polarization maintaining fiber 17, no polarization conversions, e.g. by single-mode connecting fibers, interfere with the achieved optimum coupling into the polarization maintaining fiber.

Figure 4A:
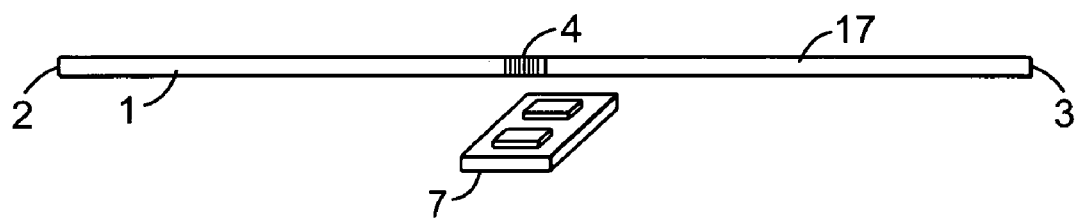
FIG. 4a is a diagrammatic view of still another embodiment of a fiber polarimeter according to the present invention with a special grating in a standard fiber and a PMF as an output fiber.
Figure 4B:
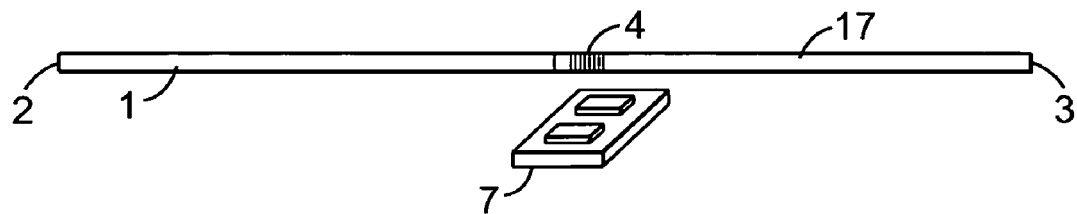
FIG. 4b is a diagrammatic view of a further embodiment of fiber polarimeter according to the present invention with a special grating in a polarization maintaining fiber (PMF) and the PMF as an output fiber.

Referring to FIGS. 4a and 4b, the assembly for extracting control signals for the polarization-correct coupling into the principal axis of a polarization maintaining fiber 17 has a glass fiber 1 with an input 2 and a polarization maintaining glass fiber 17 with an output 3. Further, the assembly has a fiber Bragg grating 4 that is disposed either, as shown in FIG. 4a, immediately in front of or, as shown in FIG. 4b, in the polarization maintaining glass fiber 17. There the orientation of one of the two coupled-out polarization states of the fiber Bragg grating 4 coincides with the orientation of a principal axis of the polarization maintaining glass fiber 17. Also the coincidence of the average value of the two coupled-out polarization states of the fiber Bragg grating 4 with the principal axis of the polarization maintaining glass fiber 17 is desirable. Further, the assembly has a detector pair 7 for determining the signal portions coupled out and radiated by the fiber Bragg grating 4. From the two detector signals, an exact control signal for a polarization controller, which for example precedes the assembly, is extracted. The signal detection with two photodiodes is helpful for the control of the polarization, since the direction of the polarization deviation may be determined more fully, and thus a quick and aimed polarization control is attained. By electronic or mathematical weighting of the detector signals, the weighted control signal may be maximum when the polarization state exactly coincides with the principal axis of the polarization maintaining fiber 17.

Figure 5:
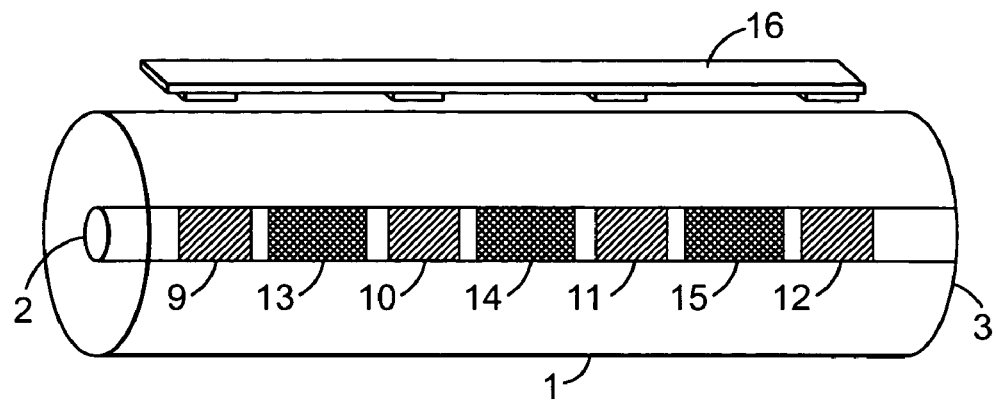
FIG. 5 is a diagrammatic view of a fiber polarimeter according to the present invention with a detector array.

FIG. 5 shows another supplement to the prior art. According to this, fiber Bragg gratings 9, 10, 11, 12 are used where the light coupled out and radiated by these gratings here has respectively only one intensity maximum and is detected by means of a detector row 16. However, the substantial difference to the disclosed prior art is that all of the fiber Bragg gratings 9–12 are inscribed with the same orientation to the fiber axis. Between each two adjacent fiber Bragg gratings 9 and 10, 10 and 11, 11 and 12, wave plates 13, 14, 15 having a certain delay and orientation are disposed. As shown in FIG. 5 at least four oblique fiber Bragg gratings are disposed, one behind the other, and with the same orientation to the fiber axis, where the coupled-out and radiated light of each grating has only one intensity maximum. The corresponding detectors are all arranged on one side of the glass fiber. This allows the use of detector rows or arrays, presenting a substantial advantage. Between two adjacent fiber Bragg gratings a wave plate with a certain orientation and delay respectively is disposed such that, despite the same orientation of the fiber Bragg gratings, the determination of the four Stokes parameters from the four detector signals becomes possible. For example, the four fiber Bragg gratings may be disposed with the orientation 0°, separated by 3 $\lambda/4$ wave plates with the orientation 45°, 0° and again 0°. Since all of the fiber Bragg gratings radiate into the same direction, the advantageous use of two or four quadrant photodiodes or of planar detector rows or arrays, respectively, is feasible.

Figure 6:
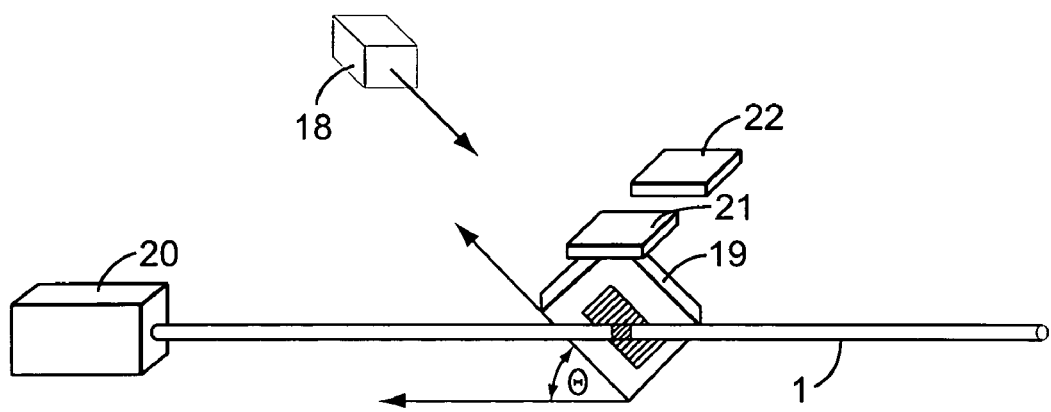
FIG. 6 is a diagrammatic view of an assembly for manufacturing the special fiber Bragg gratings according to the present invention.

In inscribing fiber Bragg gratings into optical fibers the fact that, by influence of powerful UV radiation (excimer laser: KrF, ArF) on quartz glass doped with germanium the refractive index of the fiber core permanently increases, is used. This inscribing process may be effected either by interferometric superposition of two partial beams of a separated laser beam, by transverse laser illumination of a prefabricated phase mask or by punctual controlled laser illumination of the optical fiber. In each case, a remaining periodic structural variation of the refractive index in the fiber core is generated. This plurality of reflection sites corresponds to an optical grating and has either equidistant or varying distances. In FIG. 6, a preferred assembly for producing the special fiber Bragg gratings is shown in diagrammatic form. It has a UV laser 18, a phase mask 19 and the glass fiber 1. Further, means for positioning the fiber 1 and phase mask 19, a depolarized light source 20, as well as large area detectors 21, 22 are provided. By UV illumination of the glass fiber 1 the required oblique fiber Bragg gratings are produced. The light coupled-out by the fiber Bragg gratings has two spatially separated intensity maximums occurring in different polarizations. This spatial distribution results with appropriate selection of grating constant and angle ⊖ as well as exact adjustment of the inscribing beam. The coupled-out power may be observed by means of suitably positioned detectors 21, 22 and optionally may be corrected by variation of the adjustment between inscribing beam, phase mask and fiber during the manufacture. By the use of a cylindrical lens for beam focusing, the manufacturing process may be substantially accelerated.

Figure 7:
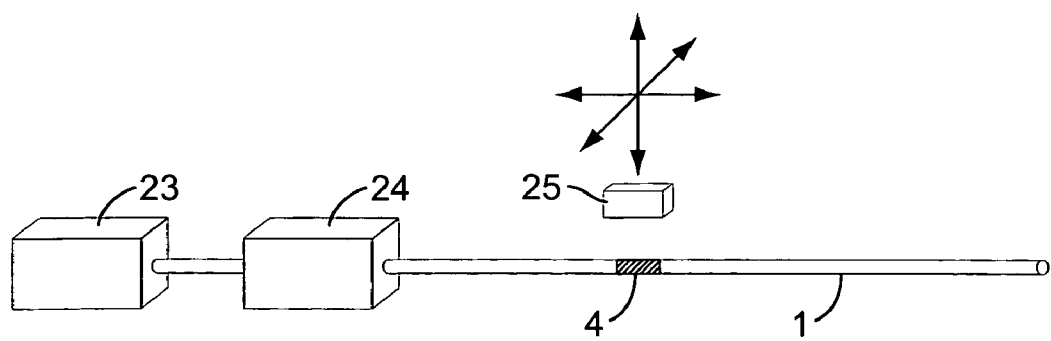
FIG. 7 is a diagrammatic view of an assembly for determining the radiation characteristic according to the present invention.

FIG. 7 shows an assembly for determining the radiation characteristic of the fiber Bragg gratings. It consists of a polarized light source 23, a polarization controller 24, the fiber Bragg grating 4 to be examined, and a detector 25, positionable by appropriate means, having a small detection area for sensing the spatial intensity distribution. By varying the detector position, the radiation characteristic may be determined. By varying the polarization state by means of the polarization controller 24, the variation of the radiation characteristic may be observed. If a depolarized light source 20, such as an ASE source, is used, the polarization controller 24 may be omitted.

FIG. 8 shows the optimum distribution of the four coupled-out polarizations (with respect to the fiber input) according to R. M. A. Azzam et al.: General analysis and optimization of the four-detector photopolarimeter, J. Opt. Soc. Am., Vol. 5, No. 5, May 1988. The polarizations right-handed circular and three left-handed elliptical polarizations with the ellipticity angle of −9.736° and the azimuthal angles 0°, 60° and −60° constitute the corner points of the pyramid with the greatest possible volume that can be inscribed within the Poincaré sphere.

FIG. 9 shows an identical, but spatially rotated, pyramid within the Poincaré sphere for the fiber polarimeter of FIG. 1. The corner points are formed by two linear polarizations with an azimuthal angle of ±(2*27.3675°) and two elliptical polarizations with the ellipticity angles of ±(2*27.3675°) and an azimuth of 90°.

Figure 10A:
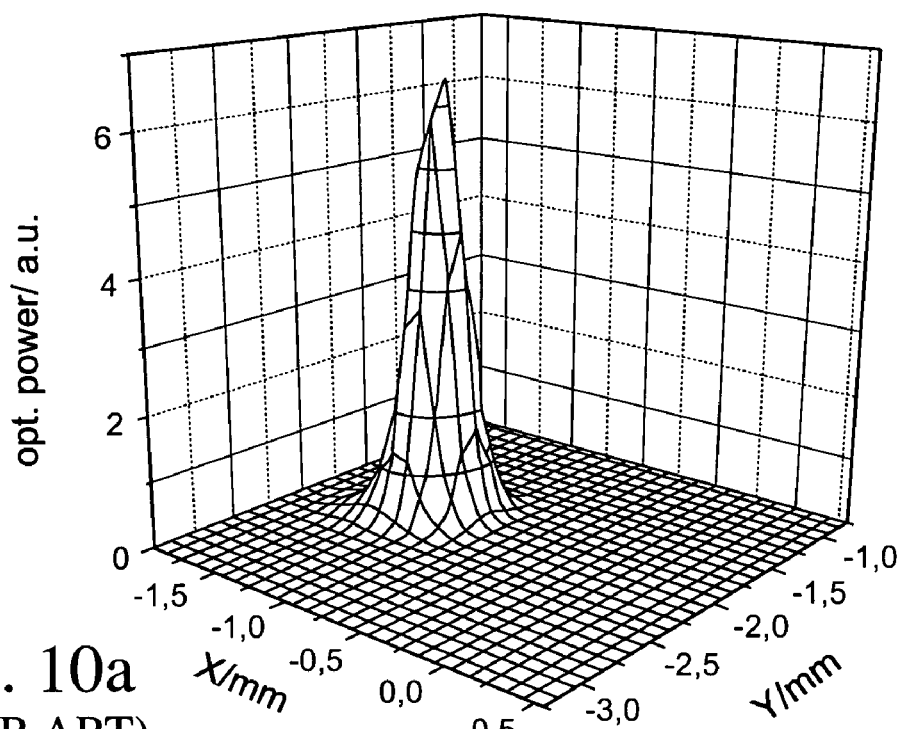
FIGS. 10a and 10b are illustrative graphic views of the measured intensity distribution of the coupled-out light of an oblique grating according to the prior art.
Figure 10B:
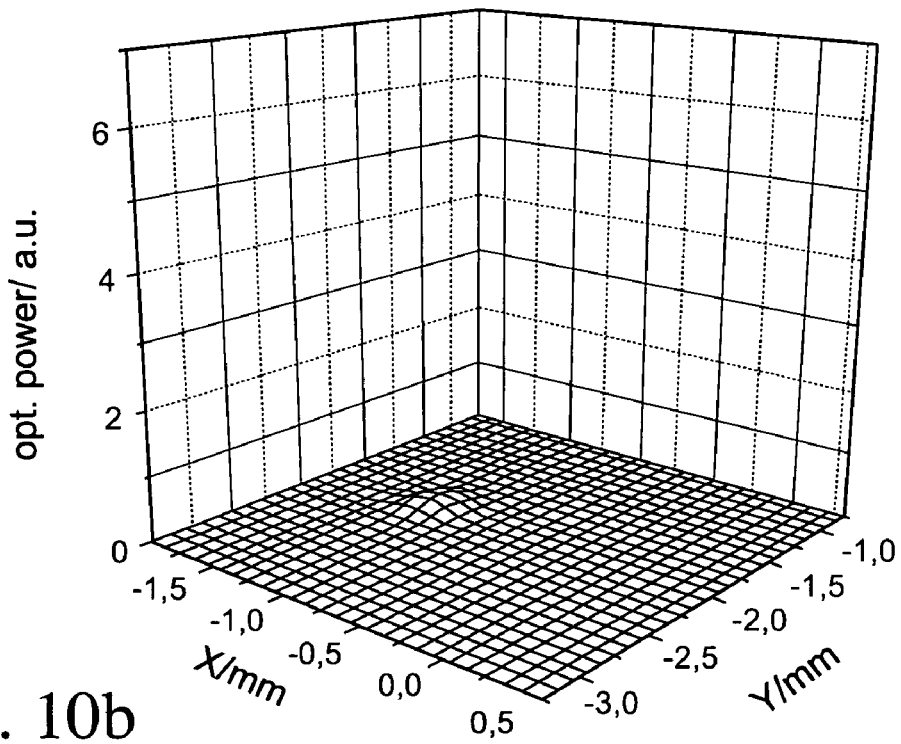
Figure 11A:
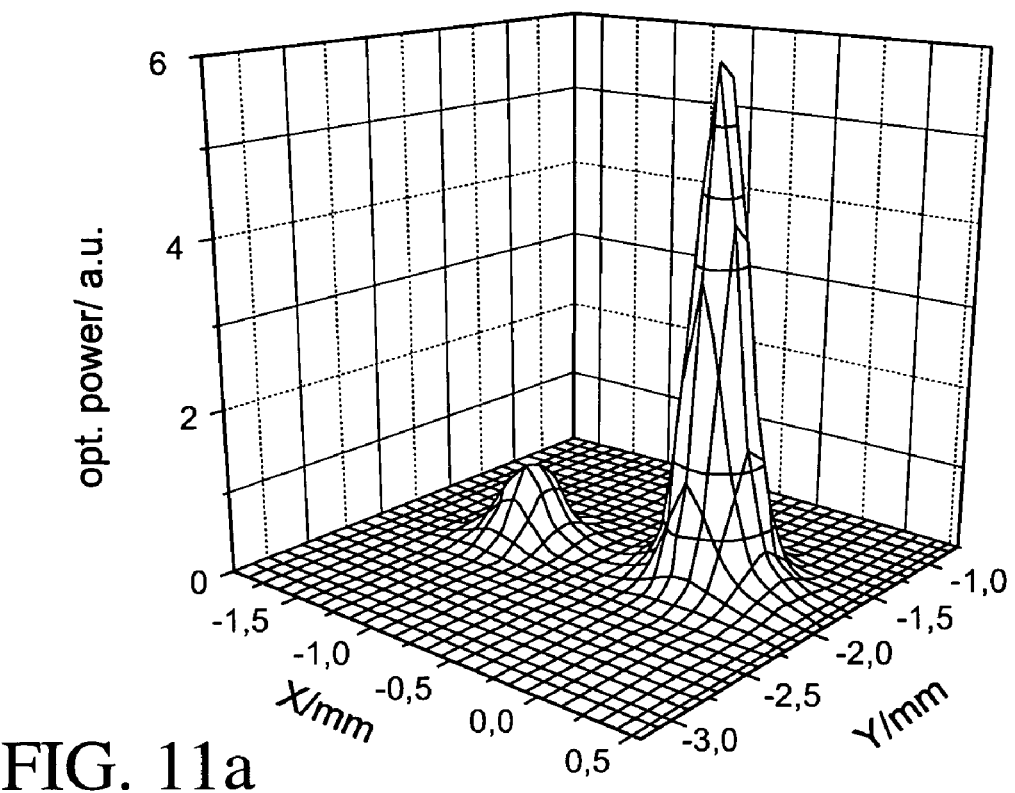
FIGS. 11a and 11b are illustrative graphic views of the measured intensity distribution of the coupled-out light of an oblique grating according to the present invention with a polarized light source.
Figure 11B:
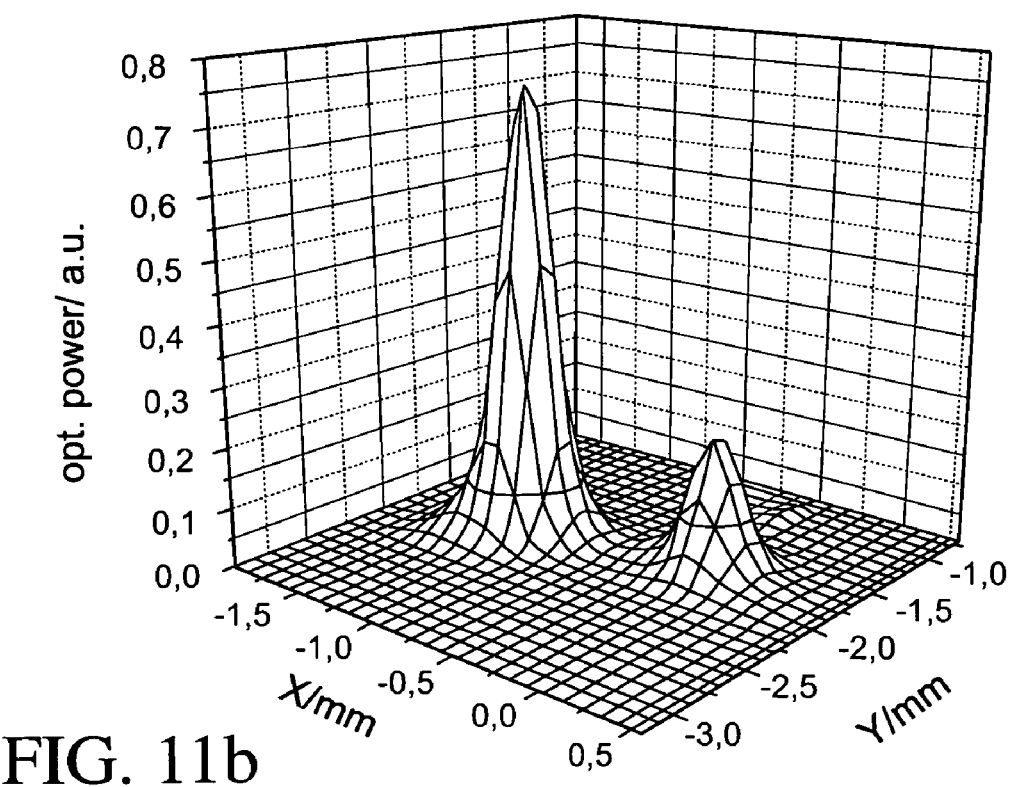
Figure 12:
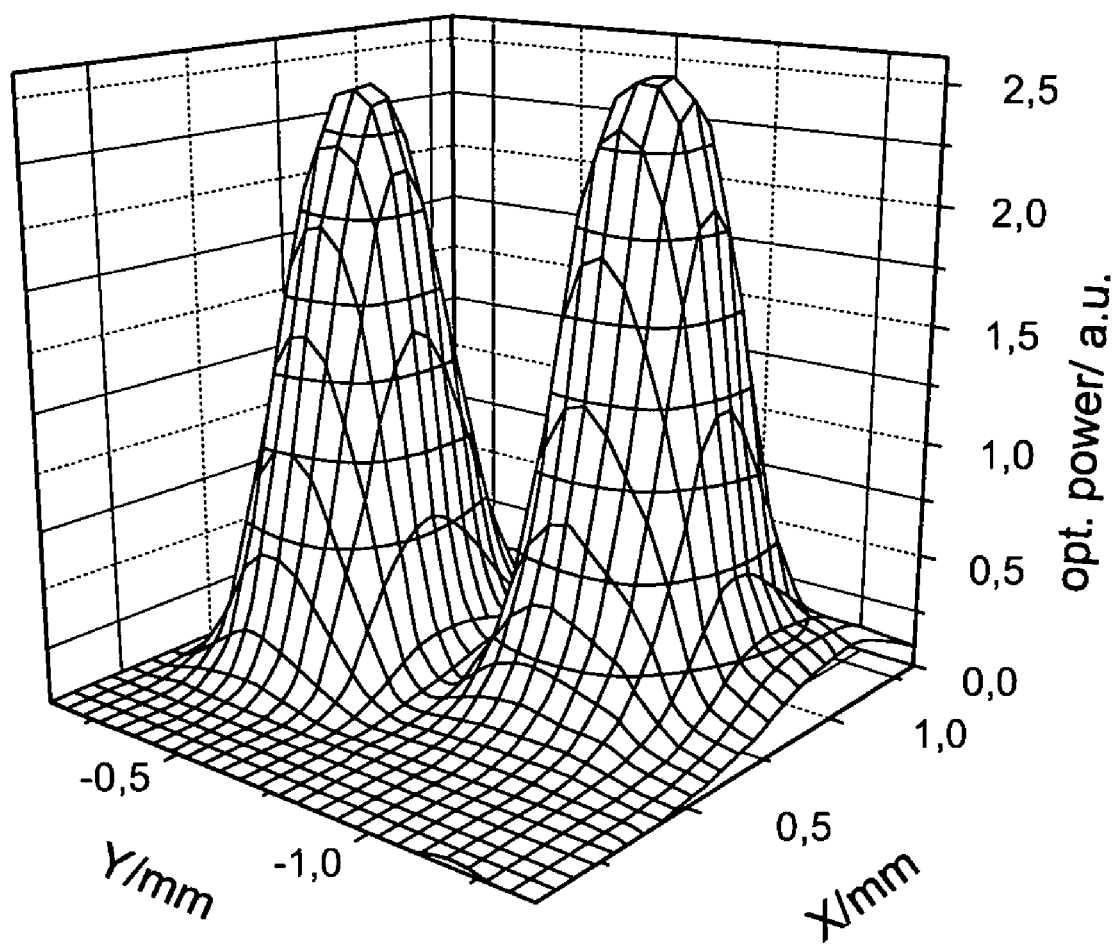
FIG. 12 is an illustrative graphic view of the measured intensity distribution of the coupled-out light of an oblique grating according to the present invention with an unpolarized light source.

FIGS. 10 to 12 show example recorded radiation characteristics: FIGS. 10a and 10b show the radiation characteristics of an oblique fiber Bragg grating according to the known prior art using a polarized light source. In FIG. 10a, the polarization of the light has been adjusted for achieving maximum coupling-out, and in FIG. 10b for achieving minimum coupling-out.

FIGS. 11a and 11b show examples of the radiation characteristics of a special fiber Bragg grating according to the present invention. For characterization, analogous to FIGS. 10a and 10b, the input polarization has been varied and the respective radiation characteristics in FIG. 11a and 11b have been recorded. In contrast to FIGS. 10a and 10b, the radiation characteristics of the special fiber Bragg grating has two spatially separated intensity maximums occurring in different polarizations.

FIG. 12 shows an example of the radiation characteristics of the special fiber Bragg grating according to the present invention. For characterization, in contrast to FIGS. 11a and 11b, a depolarized light source has been used. In this case both intensity maximums may be shown simultaneously.

Thus the present invention provides a fiber polarimeter, the use thereof, as well as methods for determining the polarization, the degree of polarization and/or the power of the light guided in a glass fiber, with one or more oblique fiber Bragg gratings, disposed one behind the other, where the fiber Bragg gratings couple out depending on the polarization.

What is claimed is:

1. A fiber polarimeter comprising:
   a fiber having an input for receiving a light wave of any composition, an output and an axis, the fiber including a fiber Bragg grating inscribed at an angle to the axis so that two portions of the light wave of any composition input to the fiber, depending upon the polarization of the light wave, are coupled out of the fiber spatially separated with intensity maximums occurring in different polarization states; and
   means for detecting the portions of the light wave from the fiber Bragg grating to provide measurement data.

2. The fiber polarimeter as recited in claim 1 wherein the fiber Bragg grating comprises:
   at least two fiber Bragg gratings inscribed at respective angles in the fiber; and
   a wave plate disposed in the fiber between the at least two fiber Bragg gratings.

3. The fiber polarimeter as recited in claims 1 or 2 further comprising means for calculating four Stokes parameters from the measurement data in order to determine polarization, degree of polarization and/or power of the light wave.

4. The fiber polarimeter as recited in claim 2 wherein the respective angles have the same orientation with respect to the axis.

5. The fiber polarimeter as recited in claim 2 wherein the respective angles have different orientations with respect to the axis.

6. The fiber polarimeter as recited in claim 2 wherein the fiber Bragg gratings and the wave plate have respective orientations such that all intensity maximums or minimums occur in different polarizations of the light wave.

7. The fiber polarimeter as recited in claim 2 wherein the fiber Bragg gratings and the wave plate have respective orientations and the fiber Bragg gratings have parameters such that all intensity maximums or minimums occur in different polarizations of the light wave that have greatest possible distances from each other on a Poincare sphere.

8. The fiber polarimeter as recited in claim 2 wherein the wave plate is produced by a method selected from the group consisting of ultra-violet (UV) induced birefringence in the core of the fiber, compressive loading of the fiber, looping of the fiber and inserting a section of linear birefringent fiber in the fiber.

9. The fiber polarimeter as recited in claims 1, 2, 4, 5, 6, 7 or 8 wherein the fiber is selected from the group consisting of a single-mode standard fiber, a single-mode fiber having a predetermined doping profile and a birefringent fiber.

10. The fiber polarimeter as recited in claims 1 or 2 wherein each fiber Bragg grating is produced by means of a phase mask.

11. The fiber polarimeter as recited in claims 1 or 2 wherein the detecting means comprises appropriately dimensioned detectors adjusted according to intensity maximums from each fiber Bragg grating and fixedly coupled to the fiber.

12. The fiber polarimeter as recited in claim 11 wherein the appropriately dimensioned detectors are grouped as detector pairs for each fiber Bragg grating.

13. The fiber polarimeter as recited in claim 2 wherein the fiber Bragg gratings and wave plate are oriented and dimensioned so that polarization dependent losses of the fiber Bragg gratings compensate for each other.

14. The fiber polarimeter as recited in claim 1 wherein the fiber Bragg grating comprises:
   a plurality of fiber Bragg gratings inscribed in the fiber; and
   a plurality of wave plates disposed in the fiber between consecutive ones of the fiber Bragg gratings.

15. The fiber polarimeter as recited in claim 14 wherein the fiber Bragg gratings are oriented and have coupling-out efficiencies dimensioned so that polarization dependent losses of each fiber Bragg grating is compensated by the subsequent fiber Bragg grating in the fiber.

16. The fiber polarimeter as recited in claims 1 or 2 further comprising a birefringent polarization maintaining fiber coupled to the output of the fiber.

17. The fiber polarimeter as recited in claim 1 further comprising a birefringent polarization maintaining fiber coupled to the output of the fiber with the fiber Bragg grating located at a position selected from the group consisting of in the fiber adjacent to the output and in the birefringent polarization fiber adjacent to the output of the fiber.

18. A polarimetric method comprising the steps of:
   coupling a light wave of any composition into a fiber having a fiber Bragg grating inscribed in the fiber at an angle to an axis of the fiber so that two portions of the light wave of any composition input to the fiber, depending upon the polarization of the light wave, are coupled out of the fiber spatially separated with intensity maximums occurring in different polarization states; and
   coupling at least two portions of the light wave, depending upon the polarization of the light wave, out of the fiber at the fiber Bragg grating, the two portions being spatially separated with intensity maximums occurring at different polarization states.

19. The polarimetric method as recited in claim 18 further comprising the step of detecting each portion coupled out of the fiber at the fiber Bragg grating to provide measurement data.

20. The polarimetric method as recited in claims 18 or 19 wherein the fiber Bragg grating comprises at least two fiber Bragg gratings inscribed in the fiber and a wave plate disposed in the fiber between the at least two fiber Bragg gratings.

21. The polarimetric method as recited in claim 20 further comprising the step of providing a signal related to four Stokes parameters from the measurement data in order to determine polarization, degree of polarization and/or power for the light wave.

22. The polarimetric method as recited in claim 20 wherein the detecting step comprises the step of coupling a plurality of detectors to the fiber according to the intensity maximums from each fiber Bragg grating.

23. The polarimetric method as recited in claim 22 wherein the plurality of detectors are grouped in pairs for each fiber Bragg grating.

24. A fiber polarimeter, comprising:
   an optical fiber, the fiber including an input end for receiving an optical signal, an output end, and an optical axis; and
   a first fiber Bragg grating formed in the optical fiber, the first fiber Bragg grating formed such that light signal of any composition is coupled out from the first fiber Bragg grating in two intensity maxima, each of the two intensity maxima corresponding to a different polarization of the optical signal.

25. The fiber polarimeter of claim 24, further including:
   a second fiber Bragg grating formed in the optical fiber, the second fiber Bragg grating formed such that light wave of any composition is coupled out from the second fiber Bragg grating in two intensity maxima, each of the two intensity maxima corresponding to different polarizations of an incident optical signal; and
   a wave plate disposed in the optical fiber between the first fiber Bragg grating and the second fiber Bragg grating to receive the optical signal and provide the incident optical signal.

26. The fiber polarimeter of claim 25 wherein the first fiber Bragg grating and the second fiber Bragg grating are both inscribed at the same angle with respect to the optical axis.

27. The fiber polarimeter of claim 25, wherein the first fiber Bragg grating is inscribed with a different angle with respect to the optical axis than the second fiber Bragg grating.

28. The fiber polarimeter of claim 25 wherein the first fiber Bragg grating, the second fiber Bragg grating, and the wave plate are respectively oriented with respect to the optical axis that the two intensity maxima coupled out from the first fiber Bragg grating and the intensity maxima coupled out from the second fiber Bragg grating each represent different polarizations of the optical signal.

29. The fiber polarimeter of claim 28, wherein the intensity maxima from the first fiber Bragg grating and the intensity maxima from the second fiber Bragg grating represent polarizations of the optical signal that have the greatest possible distances from each other on a Poincare sphere.

30. The fiber polarimeter of claim 25, wherein the wave plate is produced by a method selected from the group consisting of ultra-violet (UV) induced birefringence in a core of the optical fiber, compressive loading of the optical fiber, looping of the optical fiber and inserting a section of linear birefringent fiber in the optical fiber.

31. The fiber polarimeter of claim 24, wherein the optical fiber is selected from the group consisting of a single-mode standard fiber, a single-mode fiber having a doping profile, and a birefringent fiber.

32. The fiber polarimeter of claim 25, wherein the first Bragg grating and the second Bragg grating are produced with a phase mask.

33. The fiber polarimeter of claim 25, further including
   a first detector coupled to receive the two intensity maxima from the first Bragg grating; and
   a second detector coupled to receive the two intensity maxima from the second Bragg grating,
   wherein the first detector provides signals related to the two intensity maxima from the first Bragg grating and the second detector provides signals related to the two intensity maxima from the second Bragg grating.

34. The fiber polarimeter of claim 33, further including a signal processor coupled to receive the signals from the first detector and the signals from the second detector and calculate Stokes parameters.

35. The fiber polarimeter of claim 33, wherein the first detector includes a detector pair positioned to receive the two intensity maxima from the first Bragg grating, and the second detector includes a detector pair positioned to receive the two intensity maxima from the second Bragg grating.

* * * * *